(12) United States Patent
Mizuta et al.

(10) Patent No.: US 8,741,468 B2
(45) Date of Patent: Jun. 3, 2014

(54) FILM-PACKAGED ELECTRIC DEVICE

(71) Applicant: NEC Corporation, Tokyo (JP)

(72) Inventors: Masatomo Mizuta, Sagamihara (JP); Shunji Noda, Sagamihara (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 13/682,345

(22) Filed: Nov. 20, 2012

(65) Prior Publication Data

US 2013/0078507 A1 Mar. 28, 2013

Related U.S. Application Data

(62) Division of application No. 12/282,843, filed as application No. PCT/JP2007/054319 on Mar. 6, 2007, now Pat. No. 8,383,261.

(30) Foreign Application Priority Data

Mar. 13, 2006 (JP) .................................. 2006-067496

(51) Int. Cl.
*H01M 2/06* (2006.01)
*H01M 2/18* (2006.01)

(52) U.S. Cl.
USPC ........................... 429/130; 429/180; 429/186

(58) Field of Classification Search
USPC .................. 429/130, 162, 163, 180, 181, 186
See application file for complete search history.

(56) References Cited

U.S. PATENT DOCUMENTS

| 8,067,113 | B2 * | 11/2011 | Yamashita et al. ........ 429/181 X |
| 2003/0228515 | A1 | 12/2003 | Woehrle et al. |
| 2007/0231685 | A1 | 10/2007 | Takeuchi et al. |

FOREIGN PATENT DOCUMENTS

| JP | 2002-175790 A | 6/2002 |
| JP | 2002-298825 A | 10/2002 |
| JP | 2003-109557 A | 4/2003 |
| WO | 00/59063 A1 | 10/2000 |
| WO | 2005/086254 A1 | 9/2005 |
| WO | 2005/106988 A1 | 11/2005 |

OTHER PUBLICATIONS

Japanese Office Action issued Nov. 29, 2013 in corresponding Japanese Patent Application No. 2012-245148.

* cited by examiner

*Primary Examiner* — Stephen J. Kalafut
(74) *Attorney, Agent, or Firm* — Sughrue Mion, PLLC (57) ABSTRACT

To provide a film-packaged battery 1 in which battery element 2 formed by collectively joining a plurality of positive and negative extending portions 2a and 2b to positive and negative electrode leads 3a and 3b for each polarity, is surrounded by laminate films 5 and 6 which are formed by laminating at least heat fusion layer 10 and metal layer 11. Protection member 4a having a melting point lower than that of heat fusion layer 10 is arranged at least between each of joining portions 20a and 20b of positive and negative electrode extending portions 2a and 2b, and heat fusion layer 10 of laminate film 5 which layer face the each of joining portions 20a and 20b.

6 Claims, 7 Drawing Sheets

FILM-PACKAGED ELECTRIC DEVICE

CROSS REFERENCE TO RELATED APPLICATIONS

This application is a Divisional of U.S. patent application Ser. No. 12/282,843, filed on Sep. 12, 2008, now U.S. Pat. No. 8,383,261, which is a National Stage of International Application No. PCT/JP2007/054319, filed Mar. 6, 2007, which claims priority from Japanese Patent Application No. 2006-067496, filed on Mar. 13, 2006, the contents of all of which are incorporated herein by reference in their entirety.

TECHNICAL FIELD

The present invention relates to a film-packaged electric device in which an electric device element is covered by an outer package film.

BACKGROUND ART

There is a strong demand for reduction in weight and thickness of a battery used as a power source of a portable apparatus, an electric vehicle, and the like. However, a package (metal can) of a conventional battery has a limitation in reducing the weight and thickness. Thus, a film is used as a package whose weight and thickness can be reduced. Specifically, a metal thin film or a laminate film formed by laminating a metal thin film and a heat-fusible resin film is used as a package of a battery. The metal thin film film and the laminate film also has the advantage in which there is a higher degree of flexibility for changing the shape than in the case of a metal can.

As a typical example of the above described laminate film, there is listed a three-layer laminate film which is formed by laminating a PP layer (polypropylene layer) as a heat fusion layer on one surface of an aluminum thin film as a metal thin film, and a nylon layer or a PET layer (polyethylene terephthalate layer) as a protection layer on the other surface of the aluminum thin film.

A common film-packaged battery is configured such that a battery element formed by laminating a positive electrode plate and a negative electrode plate via a separator is surrounded by a laminate film, and that the peripheral portion of the laminate film is hermetically heat-fused. Further, in order to lead the positive electrode and the negative electrode of the battery element to the outside of the laminate film, there are provided a positive electrode lead and a negative electrode lead, the end of one lead being connected to the positive electrode plate or the negative electrode plate, and the end of the other lead being led to the outside of the laminate film. As the separator, a porous film formed by using a thermoplastic resin, such as polyolefine, is generally used.

Figure 9:
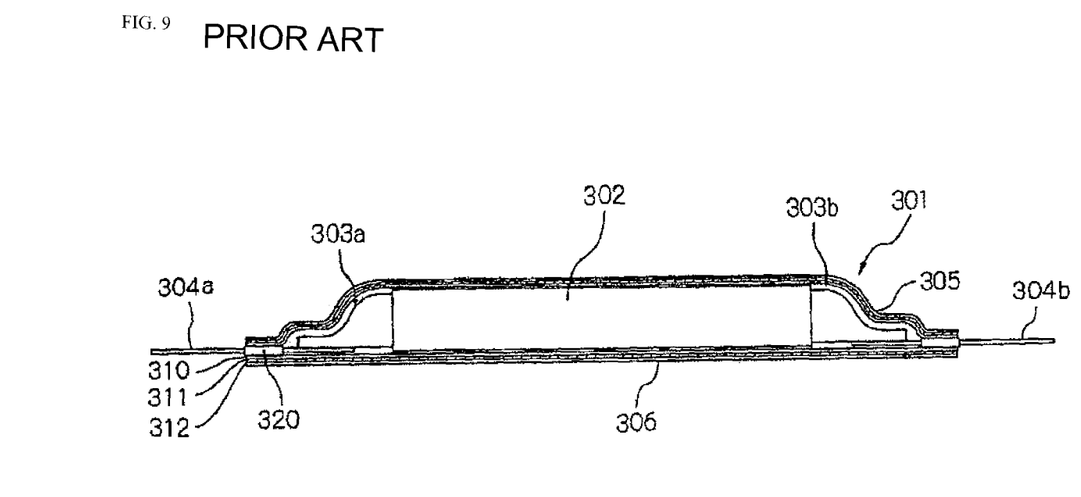
FIG. 9 is a sectional view showing a basic structure of a conventional film-packaged battery.

A configuration of a conventional film-packaged battery will be described in more detail with reference to FIG. 9. FIG. 9 is a longitudinal sectional view of a conventional film-packaged battery.

Film-packaged battery 301 has battery element 302 and a package for storing battery element 302 together with an electrolytic solution. Battery element 302 is configured by alternately laminating a plurality of positive electrode plates and a plurality of negative electrode plates via separators. Each of the positive electrode plates is formed by coating a positive electrode material on an aluminum foil, and each of the negative electrode plates is formed by coating a negative electrode material on a copper foil. Uncoated portions (extending portions) of the aluminum foil and the copper foil, on which portions the electrode materials are not coated, are led to the outside of the lamination area. The extending portions of the respective positive electrode plates (positive electrode extending portions 303a) are collectively joined to positive electrode lead 304a. Further, the extending portions of the respective negative electrode plates (negative electrode extending portions 303b) are collectively joined to negative electrode lead 304b. Note that ultrasonic welding is generally used for the joining of positive and negative electrode extending portions 303a and 303b. Further, positive electrode lead 304a and negative electrode lead 304b are produced by punching out an aluminum plate and a copper plate.

The package is configured by two sheets of laminate films 305 and 306 which surround battery element 302 by sandwiching both sides of battery element 302 in the thickness direction thereof. Each of laminate films 305 and 306 is formed by laminating PP layer 310 as a heat fusion layer, aluminum layer 311 as a metal layer, and nylon layer 312 as a protection layer.

Respective laminate films 305 and 306 surround battery element 302 in an orientation in which PP layer 310 faces the inside. The peripheral portions of facing PP layers 310 are heat-fused to each other.

In the film-packaged battery having the above described configuration, the joining portion of the positive and negative electrode extending portions, the positive and negative electrode leads, and in particular, the sharp corners of the electrode extending portions and of the electrode leads may be brought into contact with the heat fusion layer of the laminate film due to vibration, or the like, so as to damage the heat fusion layer. Further, when the heat fusion layer is damaged, the thickness of the damaged portion is reduced, so that the insulating property is deteriorated. As a result, the possibility that the metal layer as the lower layer of the heat fusion layer will be electrically short-circuited with the corner of the joining portion, is significantly increased.

In order to cope with such problem, there is proposed an insulating spacer having a triangular cross section, which houses each of the joining portions between the terminals of the positive and negative electrodes and the leads of the positive and negative electrodes (International Patent Publication No. WO 00/59063 pamphlet). The insulating spacer has an insertion hole into which each of the leads can be inserted. The insulating spacer houses an aggregate portion of the terminals of the positive and negative electrodes and fixes the laminated electrode by pressing the end surface of the laminated electrode, thereby preventing breakage of the lead, damage of the outer package film or the electric short-circuit between the outer package film and the laminated electrode.

The conventional technique including the technique as disclosed in the above described pamphlet are based on the premise that the heat fusion layer of the laminate film is damaged by the corner portion of positive and negative electrode collecting portions during use of the film-packaged battery.

Figure 10:
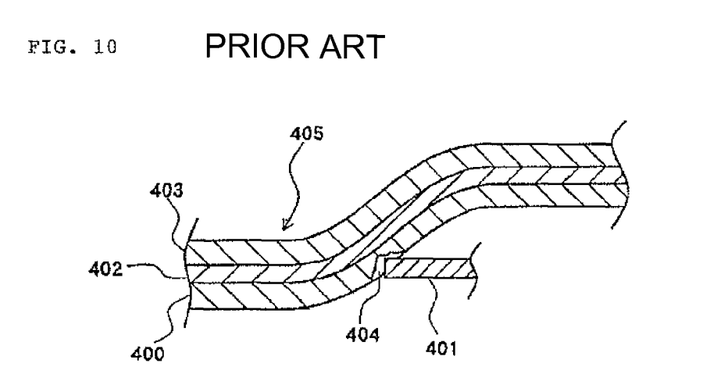
FIG. 10 is an enlarged partial sectional view showing a heat fusion layer which is damaged by a joining portion of an extending portion.

However, as a result of an extensive investigation, the present inventors have found that in many cases, the heat fusion layer of the laminate film is already damaged in the manufacturing process of the film-packaged battery. Specifically, when the facing peripheral portions of the heat fusion layers are heat-fused to each other, the heat fusion layer is softened by heating. When a part of the battery element is brought into contact with the heat fusion layer in this state, the heat fusion layer is partially damaged. Since the corner of the joined positive and negative electrode extending portions is sharp in particular, when the corner is brought into contact with the softened heat fusion layer, a flaw like a deep cut is left in the heat fusion layer. FIG. 10 schematically shows the state of the heat fusion layer damaged by the corner of the joining portion of the positive and negative electrode extending portion. In the figure, reference numeral 400 denotes a heat fusion layer, reference numeral 401 denotes a joining portion of the positive electrode extending portion, reference numeral 402 denotes a metal layer, reference numeral 403 denotes a protection layer, and reference numeral 404 denotes the flaw left in heat fusion layer 400. Note that in FIG. 10, the counterpart laminate film which is heat-fused to laminate film 405 configured by heat fusion layer 400, metal layer 402, and protection layer 403, is not shown.

Here, it is obvious that the above described damage is more easily caused and the degree of the damage is larger in the case where the corner of joining portion 401 is brought into contact with heat fusion layer 400 softened by heating than in the case where the corner of joining portion 401 is brought into contact with heat fusion layer 400 during use of the film-packaged battery, at least after the heat fusion process is completed and the heat fusion layer is cured.

The above described damage in the heat fusion layer during the manufacturing process cannot be sufficiently avoided only by providing an insulating spacer as disclosed in the above described pamphlet or other protection member made of resin between the joining portion of the positive and negative electrode extending portions, and the heat fusion layer. That is, in the case where the protection member made of resin has a melting point equal to or higher than that of the heat fusion layer, when the heat fusion layer is softened so as to be able to be heat-fused, the protection member has a stiffness equal to or higher than that of the heat fusion layer. Therefore, when the protection member is brought into contact with the softened heat fusion layer, the heat fusion layer is damaged similarly to the case where the joining portion of positive and negative electrode extending portions are brought into contact with the heat fusion layer. For example, PP generally used as the heat fusion layer has a melting point of 140° C. to 150° C. Therefore, in the case where the heat fusion layer is formed of PP, when the protection member is formed of a material having a melting point of 140° C. to 150° C., or higher, the heat fusion layer is, on the contrary, damaged by the protection member.

DISCLOSURE OF THE INVENTION

A film-packaged electric device according to the present invention includes: an electric device element configured such that a plurality of positive and negative electrode extending portions led out from a plurality of positive and negative electrode plates alternately laminated via separators are collectively joined to a positive or negative lead, respectively; and a package film configured such that at least a heat fusion layer and a metal layer are laminated with each other, to surround the electric device element with the heat fusion layer facing inward, and that the facing heat fusion layers are heat fused to each other. Further, the film-packaged electric device according to the present invention is characterized in that a protection member is arranged at least between each of joining portions of the positive and negative electrode extending portions which are respectively joined to the positive and negative electrode leads, and one of the facing heat fusion layers, and in that the melting point of the protection member is lower than the melting point of the heat fusion layer.

In the film-packaged electric device according to the present invention, which has the above described features, the heat fusion layer of the package film is not damaged by the joining portion of the positive electrode extending portion and the negative electrode extending portion. Further, even if the protection member is brought into contact with the heat fusion layer softened by heating at the time when the facing heat fusion layers are heat-fused to each other, the protection member is more softened than the heat fusion layer, and hence the heat fusion layer is not damaged by the protection member.

In the film-packaged electric device according to the present invention, a protection member having a melting point lower than that of the heat fusion layer may also be arranged between the positive and negative electrode leads and the other of the facing heat fusion layers. According to such configuration, it is possible to prevent the heat fusion layer from being damaged by the positive and negative electrode leads, and also possible to prevent the heat fusion layer from being damaged by the protection member.

Further, the protection member may be configured to have an upper surface portion arranged between the joining portion and one of the facing heat fusion layers, a lower surface portion arranged between the positive electrode lead or the negative electrode lead and the other of the facing heat fusion layers, and a connecting portion for connecting the upper surface portion and the lower surface portion, and may be configured such that an opening portion in which the positive electrode lead or the negative electrode lead can be inserted is formed in the connecting portion. When such a protection member is adopted, the positive electrode lead or the negative electrode lead is made to pass through the opening portion, whereby the upper surface portion can be arranged between the joining portion and the heat fusion portion, and whereby the lower surface portion can be arranged between the positive electrode lead or the negative electrode lead and the heat fusion layer. Therefore, the protection member is easily mounted, and the possibility of the occurrence of a failure, such as a positional deviation, is also reduced, as compared with the case where the protection member arranged between the joining portion and the heat fusion layer is separated from the protection member arranged between the positive electrode lead or the negative electrode lead and the heat fusion layer. The protection member having such configuration can be obtained, for example, in such a way that one of the surfaces of a sheet material or a film material which is folded into two portions, is used as the upper surface portion, that the other of the surfaces is used as the lower surface portion, and that the folded-back portion is used as the connecting portion.

Further, the protection member can also be three-dimensionally formed in correspondence with the shape of the positive electrode extending portion and the negative electrode extending portion. For example, in the case where each of the collected extending portions has a substantially triangular cross-sectional shape, it is preferred that the protection member is formed into a bag shape having a substantially triangular cross section by making the upper surface portion and the lower surface portion come closer to each other as they approach the opening portion. Further, when the protection member is three-dimensionally formed, it is preferred that the upper surface portion and the lower surface portion are integrally connected by a side surface portion.

Further, the protection member may also be formed into a ring shape which can be made to cover each of the joining portions of the positive electrode extending portion and the negative electrode extending portion.

The protection member can be made deformable according to the shape of the positive electrode extending portion and the negative electrode extending portion by being formed of an elastic material. Further, in the case where the protection member has elasticity, the protection member can be fixed to a predetermined position due to its elastic restoring force by making the protection member have a size equal to or slightly smaller than the size of the member covered by the protection member. Of course, the protection member can also be three-dimensionally formed by an elastic material. In the case where the protection member is formed to have elasticity, it is preferable to form the protection member using a foamed material. Further, the protection member may also be configured such that only a part of the protection member has elasticity. In the case where only a part of the protection member is made capable of expanding and contracting, it is preferred that the central portion of the protection member be formed of an elastic material, and that the corner portion of the protection member be formed of a non-elastic material.

Further, the protection member can also be formed into a frame shape which can be made to cover the peripheral portion of the electric device element, and which is configured such that a first opening portion into which the positive electrode lead can be inserted is formed in one side of a pair of sides that face each other, that a second opening portion into which the negative electrode lead can be inserted is formed in the other side of a pair of sides that face each other, that the side in which the first opening portion is formed is arranged between the joining portion of the positive electrode extending portion and the heat fusion layer, and that the side in which the second opening portion is formed is arranged between the joining portion of the negative electrode extending portion and the heat fusion layer.

In the present invention, the respective materials are not limited in particular as long as the protection member has a melting point lower than that of the heat fusion layer. However, it is preferred that the protection member be formed of polyethylene, and that the heat fusion layer be formed of polypropylene.

The present invention is based on the above described knowledge obtained first by the research performed by the present inventors. An object of the present invention is to provide a film-packaged electric device provided with a protection member for protecting a heat fusion layer of an outer package film surrounding an electric device element.

These and other objects, features, and advantages of the present invention will become apparent from the following description and the accompanying drawings showing exemplary embodiments of the present invention.

BEST MODE FOR CARRYING OUT THE INVENTION

Next, an exemplary embodiment of a film-packaged electric device according to the present invention will be described. The film-packaged electric device according to the present exemplary embodiment is a film-packaged battery in which a battery element is surrounded by a film-like package.

Figure 1:
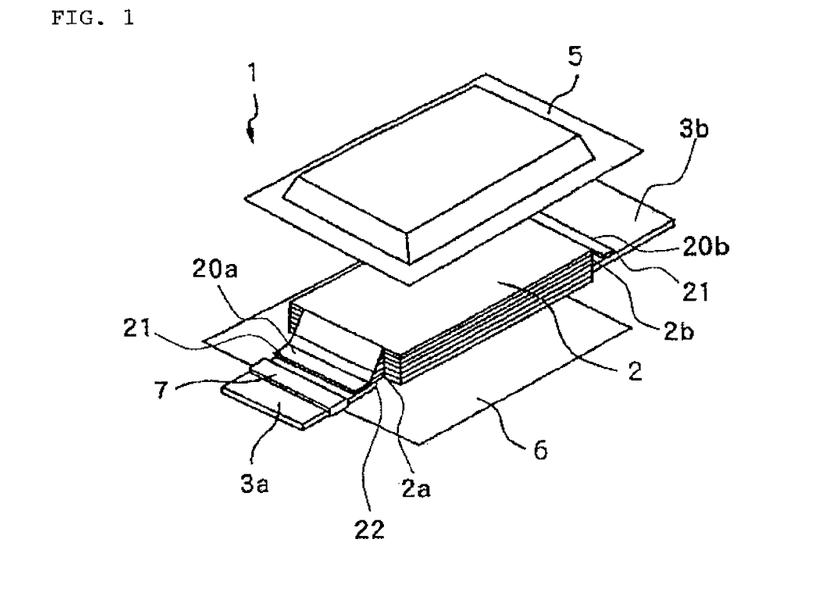
FIG. 1 is an exploded perspective view of a film-packaged battery according to the present invention.
Figure 2:
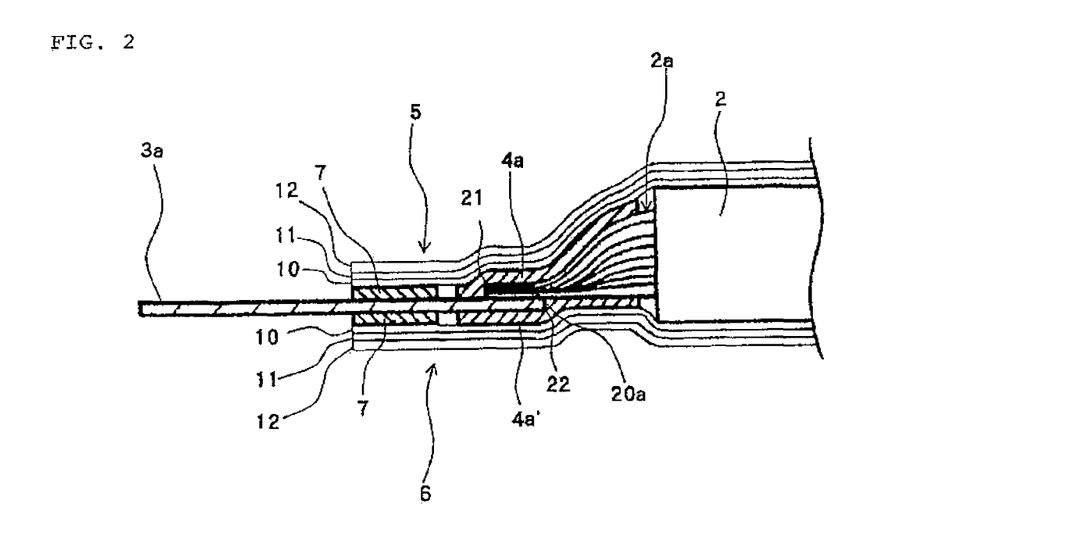
FIG. 2 is an enlarged partial sectional view of the film-packaged battery shown in FIG. 1.

FIG. 1 is an exploded perspective view of the film-packaged battery according to the present exemplary embodiment. FIG. 2 is a partially omitted enlarged sectional view of the film-packaged battery. Film-packaged battery 1 includes battery element 2 having positive electrode extending portion 2a and negative electrode extending portion 2b, a package in which battery element 2 is stored together with electrolytic solution (not shown), positive electrode lead 3a connected to positive electrode extending portion 2a, negative electrode lead 3b connected to negative electrode extending portion 2b, and protection members 4a and 4a'. The package is configured by two laminate films 5 and 6. Note that protection members 4a and 4a' are not shown in FIG. 1.

Battery element 2 is configured by separators and a plurality of positive electrode plates and negative electrode plates which are alternately laminated via the separators. Specifically, each of the positive electrode plates is an aluminum foil coated with positive electrode material. Each of the negative electrode plates is a copper foil coated with negative electrode material. Portions (uncoated portions) of the respective foils, which portions are not coated with the electrode materials, are led out to the outside of the lamination area, so as to configure positive and negative electrode extending portions 2a and 2b. Then, respective positive electrode extending portions 2a are collectively joined to a rear portion of positive electrode lead 3a by ultrasonic welding. Respective negative electrode extending portions 2b are collectively joined to a rear portion of negative electrode lead 3b by ultrasonic welding. Here, in order to improve the fusing properties of laminate films 5 and 6, polypropylene is applied to the front and rear surfaces of each of positive electrode lead 3a and negative electrode lead 3b in a strip form, so that coating portions 7 are formed. Note that coating portions 7 of positive and negative electrode leads 3a and 3b are formed at positions nearer to the front end of leads 3a and 3b than the positions at which positive and negative electrode extending portion 2a and 2b are joined to positive and negative electrode leads 3a and 3b.

Two laminate films 5 and 6 configuring the package are made to sandwich both thickness directions of battery element 2 so as to thereby surround battery element 2. Each of laminate films 5 and 6 is configured by three layers of heat fusion layer 10, metal layer 11, and protection layer 12. In the present exemplary embodiment, heat fusion layer 10 is formed of PP (polypropylene), metal layer 11 is formed of aluminum, and protection layer 12 is formed of nylon or PET (polyethylene terephthalate). Respective laminate films 5 and 6 are made to surround battery element 2 with heat fusion layer 10 facing inward. Further, the facing peripheral portions of heat fusion layers 10 of respective laminate films 5 and 6 are hermetically heat-fused to each other. Further, the areas of the peripheral portions of heat fusion layers 10 of respective laminate films 5 and 6, which face positive and negative electrode leads 3a and 3b, are heat-fused to coating layers 7 formed on respective leads 3a and 3b.

Protection member 4a is provided between joining portions 20a and 20b of positive and negative electrode extending portions 2a and 2b, and laminate film 5 (heat fusion layer 10). Further, protection member 4a' is provided between positive and negative electrode leads 3a and 3b, and laminate film 6 (heat fusion layer 10). Note that in FIG. 2, there are only shown protection member 4a provided between joining portion 10a of positive electrode extending portion 2a and laminate film 5, and protection member 4a provided between positive electrode lead 3a and laminate film 6. However, protection member arranged on the side of positive electrode and protection member arranged on the side of negative electrode have the same configuration and the same operation effect. Therefore, here, protection members 4a and 4a' shown in the figure are taken as an example, and the configuration and operation effect of these are described.

Each of protection members 4a and 4a' is a film or a sheet made of resin (PE: polyethylene in the present exemplary embodiment) having a melting point lower than that of heat fusion layer 10. The thickness of each of protection members 4a and 4a' is about 100 μm. Protection member 4a has a shape and size that are sufficient for covering joining portion 20a of positive electrode extending portions 2a, which joining portion is collectively welded to positive electrode lead 3a, or sufficient for covering at least corners 21 of joining portion 20a. On the other hand, protection member 4a' has a shape and size that are sufficient for covering the rear portion of positive electrode lead 3a, or sufficient for covering at least rear corner portions 22 of positive electrode lead 3a. However, in the present exemplary embodiment, protection members 4a and 4a' have the same shape and size.

Protection members 4a and 4a' play a role of protecting heat fusion layers 10 of laminate films 5 and 6 at the time when heat fusion layers 10 are heat-fused to each other. Specifically, protection member 4a is provided between heat fusion layer 10 of laminate film 5 and joining portion 20a, or at least between corner 21 of joining portion 20a and heat fusion layer 10, so as to prevent heat fusion layer 10 from being damaged by corner 21. On the other hand, protection member 4a' is provided between heat fusion layer 10 of laminate film 6 and positive electrode lead 3a, or at least between rear corner portion 22 of lead 3a and heat fusion layer 10, so as to prevent heat fusion layer 10 from being damaged by rear corner portion 22.

That is, in the manufacturing process of film-packaged battery 1, laminate films 5 and 6 are arranged so as to sandwich battery element 2 from both thickness directions of battery element 2. Then, peripheral portions of laminate films 5 and 6 are heated by a heater, so that the facing peripheral portions of heat fusion layers 10 are heat-fused to each other, and heat fusion layer 10 is heat-fused to coating layer 7. At this time, when corner 21 of joining portion 20a or rear corner portion 22 of positive electrode lead 3a is brought into contact with heat fusion layer 10 softened by heating, heat fusion layer 10 is damaged. However, it is obvious from the above description, FIG. 2 and the like, that such damage is prevented by protection members 4a and 4a'.

Figure 3:
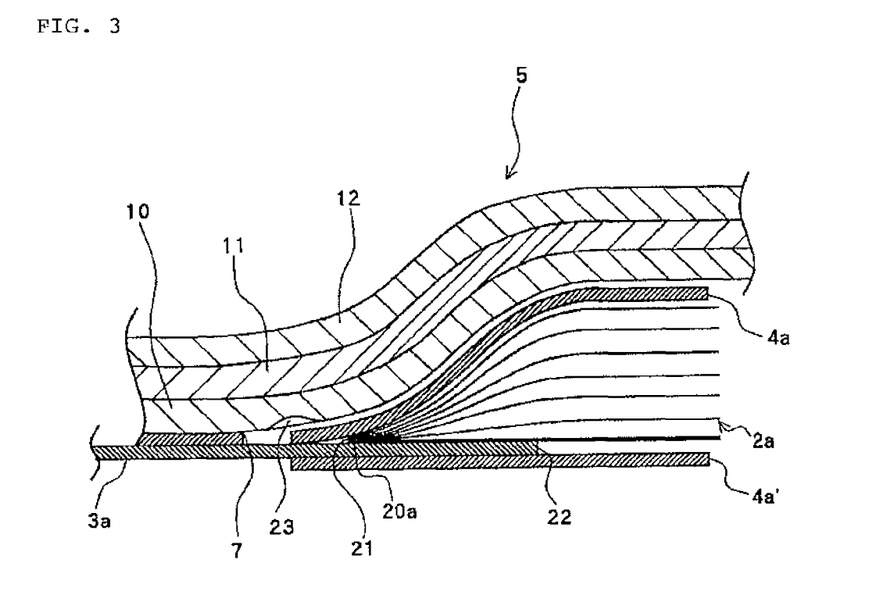
FIG. 3 is an enlarged sectional view showing the vicinity of a joining portion of a positive electrode extending portion of the film-packaged battery shown in FIG. 1.

Further, in film-packaged battery 1 according to the present exemplary embodiment, protection members 4a and 4a' are formed of polyethylene having a melting point lower than that of heat fusion layer 10. This has the following technical significance. That is, in order to enable heat fusion layers 10 made of polypropylene to be heat-fused to each other, heat fusion layers 10 need to be heated to 140° C. to 150° C. On the other hand, protection members 4a and 4a' made of polyethylene have a melting point of about 120° C. Therefore, before heat fusion layer 10 is heated to be softened, protection members 4a and 4a' are sufficiently softened. As a result, even when protection members 4a and 4a' are brought into contact with softened heat fusion layer 10, heat fusion layer 10 is not damaged by protection members 4a and 4a'. Even if a trace (flaw) caused by the contact of protection members 4a and 4a' with heat fusion layer 10 is left on heat fusion layer 10, protection members 4a and 4a' are sufficiently softened as compared with heat fusion layer 10, and hence the surface of flaw 23 takes a circular arc shape as shown in FIG. 3. Also, the depth of the flaw is very small. At least, a deep cut shaped flaw like flaw 404 shown in FIG. 10 is not left on heat fusion layer 10. Therefore, there is no possibility that the insulating property of heat fusion layer 10 will deteriorate and that an electric short circuit will thus be caused between joining portions 20a and 20b, and metal layer 11. Note that laminate film 6 shown in FIG. 2 is not shown in FIG. 3.

Note that in cases such as the case where the thickness of positive and negative electrode leads 3a and 3b is extremely thinner than joining portions 20a and 20b, and in the case where rear corner portion 22 of positive and negative electrode leads 3a and 3b is not sharpened, it is also possible to omit protection member 4a' and to provide only protection member 4a.

Figure 4:
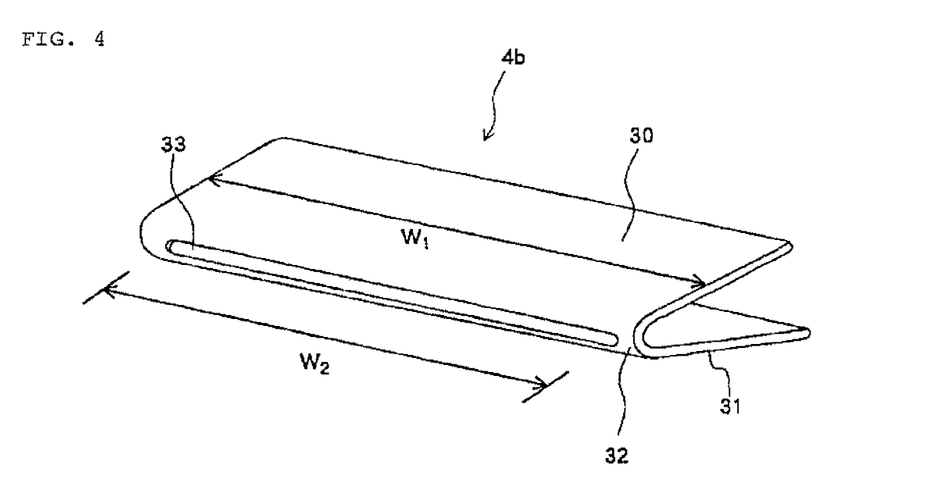
FIG. 4 is a perspective view showing a modification of a protection member.

FIG. 4 is a perspective view showing a modification of the protection member. Protection member 4b shown in FIG. 4 is formed by folding, into two portions, a sheet material or a film material made of a material (polyethylene in the present exemplary embodiment) having a melting point lower than that of heat fusion layer 10. Protection member 4b is integrally formed by upper surface portion 30 covering positive and negative electrode extending portions 2a and 2b (FIG. 1), lower surface portion 31 covering rear portions of positive and negative electrode leads 3a and 3b (FIG. 1), and connecting portion 32 for connecting upper surface portion 30 and lower surface portion 31. Further, slit 33 through which positive and negative electrode leads 3a and 3b can be made to pass, is formed in connecting portion 32. Protection member 4b is arranged on both the positive electrode side and the negative electrode side. However, protection member 4b arranged on the positive electrode side and protection member 4b arranged on the negative electrode side have the same configuration and operation effects. Therefore, the configuration and operation effect of protection member 4b will be described by taking protection member 4b arranged on the positive electrode side as an example.

Figure 5:
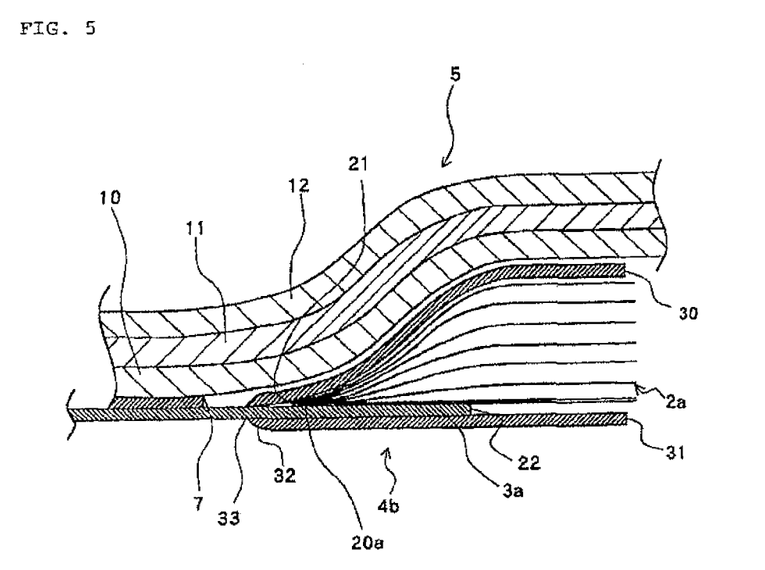
FIG. 5 is an enlarged partial sectional view showing an arrangement state of the protection member shown in FIG. 4.

In protection member 4b, as shown in FIG. 5, positive electrode lead 3a is made to pass through slit 33, and upper surface portion 30 is made to cover positive electrode extending portion 2a, and lower surface portion 31 is made to cover the rear portion of positive electrode lead 2a. Thereby, at least corner 21 of joining portion 20a and rear corner portion 22 of positive electrode lead 3a are covered by protection member 4b, so as to prevent heat fusion layer 10 from being damaged by corner 21 and rear corner portion 22. Of course, protection member 4b shown in FIG. 4 is also formed of polyethylene having a melting point lower than that of heat fusion layer 10. Thus, there is no possibility that heat fusion layer 10 will be damaged by protection member 4b. Note that laminate film 6 is also not shown in FIG. 5.

Here, it is preferred that the width ($W_1$) of upper surface portion 30 is formed to be slightly larger than the width of positive electrode extending portion 2a so that upper surface portion 30 covers positive electrode extending portion 2a as a whole in the width direction of positive electrode extending portion 2a. In the present exemplary embodiment, the width of positive electrode extending portion 2a is 66.0 mm, while the width ($W_1$) of upper surface portion 30 is 66.5 mm. In the present exemplary embodiment, upper surface portion 30 and lower surface portion 31 are made to have the same shape and size. However, upper surface portion 30 and lower surface portion 31 need not necessarily have the same shape and size.

Further, slit 33 has a shape and size so as to enable positive electrode lead 3a to be inserted therein. In the present exemplary embodiment, protection member 4b is inserted near the inner side of coating portion 7 formed on positive electrode lead 3a (see FIG. 5). Therefore, the width ($W_2$) of slit 33 is formed to be slightly larger than the width of coating portion 7 so as to enable coating portion 7 to pass through slit 33. Specifically, the width of coating portion 7 is 46.0 mm, while the width ($W_2$) of slit 33 is 46.5 mm. However, in the case where protection member 4b is formed of a material (for example, foamed material) having elasticity, it is possible to expand the width of slit 33 to some extent at the time when protection member 4b is mounted. Therefore, in the case where protection member 4b has elasticity, the width of slit 33 ($W_2$) may be set to be the same as or smaller than the width of coating portion 7.

Figure 6:
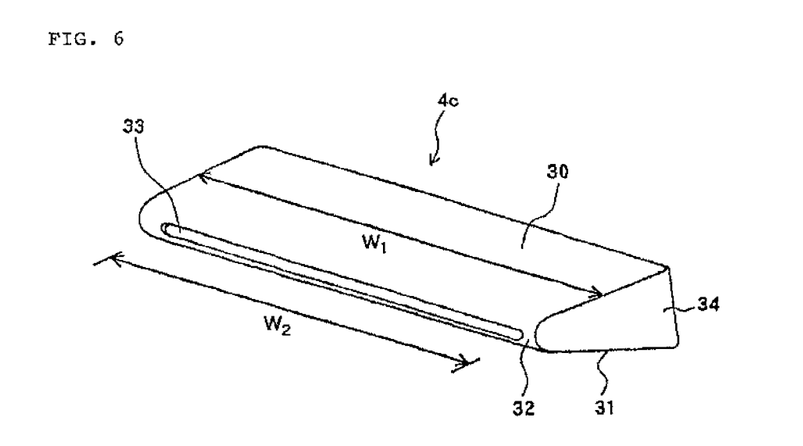
FIG. 6 is a perspective view showing another modification of the protection member.

FIG. 6 is a perspective view showing another modification of the protection member. Protection member 4c shown in FIG. 6 has a three-dimensional bag form in which upper surface portion 30 and lower surface portion 31 of protection member 4b shown in FIG. 4 are integrally connected with each other by side surface portions 34. The mounting method and mounting state of protection member 4c shown in FIG. 6 are the same as those of protection member 4b shown in FIG. 4, and hence a duplicated explanation will be omitted. However, when protection member 4c shown in FIG. 6 is used, not only the upper and lower surfaces of positive and negative electrode extending portions 2a and 2b and of positive and negative electrode leads 3a and 3b but also the side surfaces of positive and negative electrode extending portions 2a and 2b and of positive and negative electrode leads 3a and 3b are covered by protection member 4c (specifically by side surface portions 34 of protection member 4c). Therefore, it is also possible to prevent heat fusion layer 10 from being damaged by the side surfaces of positive and negative electrode extending portions 2a and 2b and of positive and negative electrode leads 3a and 3b, and by the corners of the electrode extending portions and the electrode leads.

The cross sectional shape of protection member 4c shown in FIG. 6 is formed into a substantially triangular shape in correspondence with positive and negative electrode extending portions 2a and 2b, the thickness of which is gradually reduced in the direction away from the positive and negative electrode plates (see FIG. 3 and FIG. 5). Specifically, upper surface portion 30 and lower surface portion 31 are made to come closer to each other as they approach slit 33. However, in the case where protection member 4c has elasticity so as to be able to follow the above described form of positive and negative electrode extending portions 2a and 2b, it is not necessary to make the cross sectional shape of protection member 4a correspond to the form of positive and negative electrode extending portions 2a and 2b.

Figure 7:
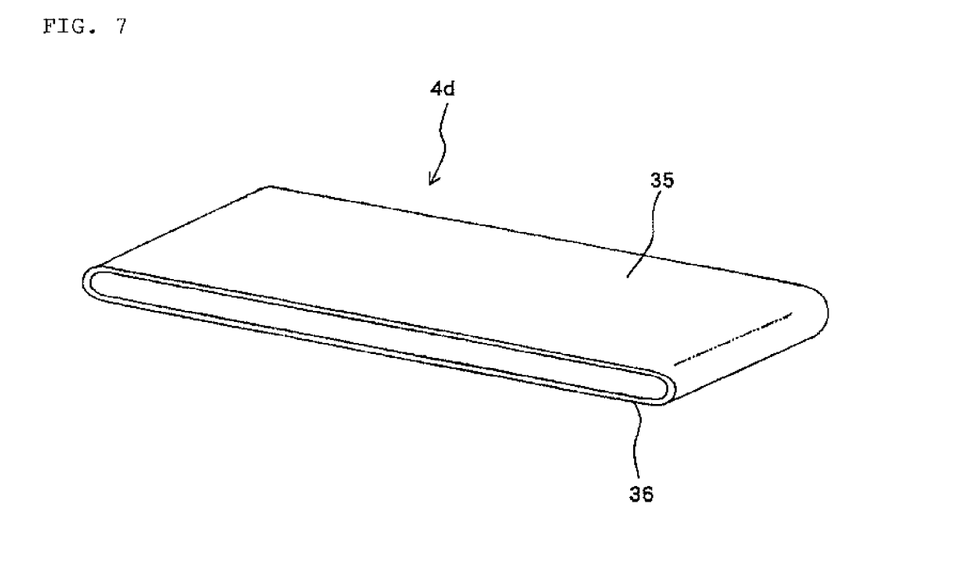
FIG. 7 is a perspective view showing another modification of the protection member.

FIG. 7 is a perspective view showing another modification of the protection member. Protection member 4d shown in the figure is obtained by forming a sheet material or a film material made of a material (polyethylene in the present exemplary embodiment) having a melting point lower than that of heat fusion layer 10 into a flat ring shape which can be made to cover the outside of each of joining portions 20a and 20b of positive and negative electrode extending portion 2a and 2b, and the outside of positive and negative electrode leads 3a and 3b. Protection member 4d is made to cover joining portions 20a and 20b, and positive and negative electrode leads 3a and 3b from the front end side of positive and negative electrode leads 3a and 3b. Specifically, upper surface 35 of protection member 4d is made to cover joining portions 20a and 20b, while lower surface 36 is made to cover positive and negative electrode leads 3a and 3b. Thereby, at least corner 21 of joining portions 20a and 20b, and rear corner portion 22 of positive and negative electrode leads 3a and 3b are prevented from being brought into direct contact with heat fusion layers 10. Here, when protection member 4d is formed of an elastic material, and of protection member 4d which is made to cover joining portions 20a and 20b and positive and negative electrode leads 3a and 3b as described above, it is fixed to joining portions 20a and 20b and positive and negative electrode leads 3a and 3b by elastic restoring force of protection member 4d. In this case, the inner diameter of protection member 4d is set to be equal to or smaller than the outer diameter of joining portions 20a and 20b, and the outer diameter of positive and negative electrode leads 3a and 3b. When protection member 4d is made to cover joining portions 20a and 20b, and positive and negative electrode leads 3a and 3b, protection member 4d is temporarily expanded to increase the inner diameter thereof. When protection member 4d is made expandable and contractible, not only protection member 4d as a whole may be made expandable and contractible, but also a part of protection member 4d may also be made expandable and contractible. Further, in the case where a part of protection member 4d is made expandable and contractible, it is preferable to make the central portions of upper surface 35 and lower surface 36 expandable and contractible.

Figure 8A:
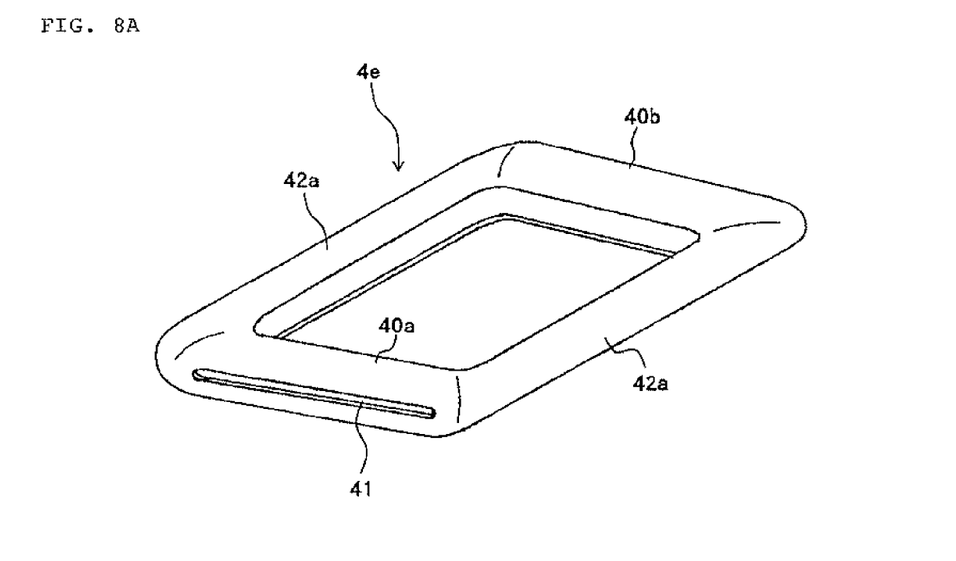
FIG. 8A is a perspective view showing another modification of the protection member.
Figure 8B:
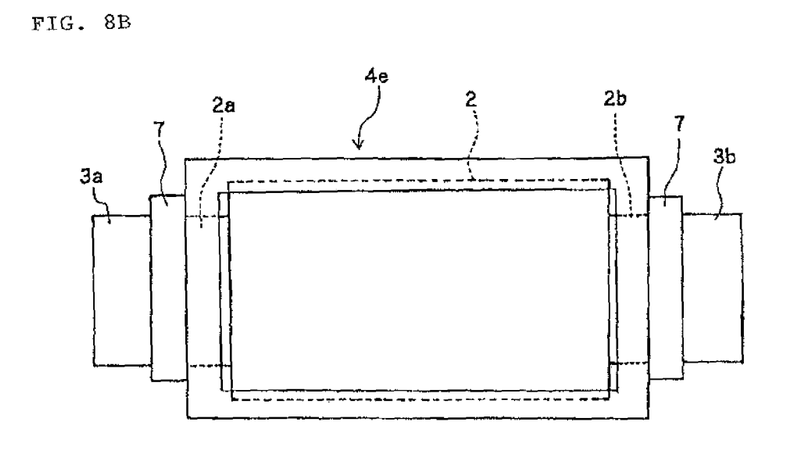
FIG. 8B is a plan view showing an arrangement state of the protection member shown in FIG. 8A.

FIG. 8A is a perspective view showing another modification of the protection member. Protection member 4e shown in FIG. 8A is formed into a substantially rectangular frame shape which can be made to cover the peripheral portion of battery element 2 (see FIG. 1). Slits 41 enabling positive and negative electrode leads 3a and 3b to pass therethrough are formed in the short side portions 40a and 40b of protection member 4e that face each other. As shown in FIG. 8B, positive and negative electrode leads 3a and 3b are made to pass through slits 41 of protection member 4e, respectively. When positive and negative electrode leads 3a and 3b are made to pass through slit 41, positive and negative electrode extending portions 2a and 2b are covered by the upper side of short side portion 40a, and positive and negative electrode leads 3a and 3b are covered by the lower side of short side portion 40a. The long sides of positive and negative electrode plates that face each other are covered by long side portions 42a and 42b, respectively. Thereby, the entire periphery of battery element 2 is covered by protection member 4e. Thus, heat fusion layer 10 is not damaged not only by positive and negative electrode extending portions 2a and 2b, and positive and negative electrode leads 3a and 3b, but also by any portion of battery element 2. Of course, protection member 4e is also formed of a material (polyethylene in the present exemplary embodiment) having a melting point lower than that of heat fusion layer 10, and hence heat fusion layer 10 will not be damaged by protection member 4e.

In the accompanying drawings of this specification, there are shown exemplary embodiments in which the protection member is brought into close contact with the positive and negative electrode extending portions or/and the positive and negative electrode leads. However, as can be seen from the above description, it is sufficient to provide the protection member between the heat fusion layer, and the positive and negative electrode extending portions or/and the positive and negative electrode leads, only so as to prevent the heat fusion layer from being damaged. Therefore, the protection member does not necessarily need to be brought into close contact with the positive and negative electrode extending portions or/and the positive and negative electrode leads.

Further, in the accompanying drawings of this specification, there are shown exemplary embodiments in which the positive and negative electrode extending portions have substantially the same width as the width of the positive and negative electrode leads. However, the width of the positive and negative electrode extending portions may be narrower or wider than the width of the positive and negative electrode leads. However, in the case where the width of the positive and negative electrode extending portions, and the width of the positive and negative electrode leads are different from those shown in the figure, the size and shape of the protection member are suitably changed so that the positive and negative electrode extending portions or/and the positive and negative electrode leads are properly covered by the protection member.

In the above, the typical exemplary embodiments according to the present invention are described. In the following, there will be additionally described the configuration of each portion of the film-packaged battery.

(Positive and Negative Electrode Lead)

Al, Cu, Ni, Ti and Fe, phosphor bronze, brass, stainless steel, and the like, can be used as the material of the positive and negative electrode leads. The positive and negative electrode leads may be subjected to annealing processing as required. As for the thickness of the positive and negative electrode leads, a thickness of 0.08 to 1.0 mm is preferred.

Further, it is also preferred to make at least a portion of the positive and negative electrode leads, which portion is brought into close contact with the package, subjected to surface treatment for improving the adhesiveness property with the package. As for surface treatment of this type, there are listed treatments, such as a surface roughening treatment by chemical etching or the like, a corrosion resistant film preparation treatment by a film made of partially aminated phenolic polymer, phosphoric acid compound and titanium compound, a corrosion resistant film preparation treatment by a zinc phosphate based film, or the like, a surface treatment by a titanium based coupling agent, an aluminate based coupling agent, or the like.

As a material of the coating layer formed on the positive and negative electrode leads, there can be used, for example, acid denaturated polypropylene, acid denaturated polyethylene, acid denaturated poly (ethylene-propylene) copolymer, ionomer, and the like.

(Package)

The package is not limited in particular as long as it has flexibility and is capable of covering the battery element so as to prevent an electrolytic solution from leaking. However, a laminate film formed by laminating a metal layer and a heat fusion layer is preferably used in particular as the package. As a laminate film of this kind, it is possible to use, for example, a laminate film in which a heat fusion layer having a thickness of 3 μm to 200 μm is formed on a metal foil having a thickness of 10 μm to 100 μm. As a material of the metal foil, it is possible to use Al, Ti, a Ti based alloy, Fe, stainless steel, an Mg based alloy, and the like. As a material of the heat fusion layer, it is possible to use polypropylene, polyethylene, acid-modified products of polypropylene or polyethylene, polyphenylene sulfide, polyester such as polyethylene terephthalate, polyamide, ethylene vinyl acetate copolymer, and the like. Further, as a material of the protection layer, it is possible to use polyamide such as nylon, polyester such as PET and polyethylenenaphthalate (PEN), polypropylene, and the like.

(Battery Element)

The positive electrode plate is not limited in particular, as long as it absorbs positive ions or emits negative ions at the time of discharge. As a material of the positive electrode plate, it is possible to use any of known positive electrode materials as listed below under (1) to (3).

(1) Metal oxides, such as $LiMnO_2$, $LiMn_2O_4$, $LiCoO_2$ and $LiNiO_2$
(2) Conductive polymers, such as polyacethylene and poly aniline
(3) disulfide compound (Dithioglycol, 2,5-dimercapto-1,3,4-thiadiazole, S-triazine-2,4,6-trithiol, and the like) expressed by general formula $(R\text{—}Sm)n$ (R is aliphatic series or aromatic series, S is sulfur, and m and n are integers satisfying $m \geq 1$ and $n \geq 1$).

Further, the positive electrode plate can be formed by mixing a positive electrode active material (not shown) with a suitable binder and a functional material. As the binder, there are listed halogen-containing polymer such as polyvinylidene fluoride, and the like. As the functional material, there are listed acetylene black for securing electron conductivity, conductive polymers, such as, polypyrrole, and poly aniline, polymer electrolyte for securing ion conductivity, a composite of these materials, and the like.

The negative electrode plate is not limited in particular as long as it is capable of storing and releasing cation. As a material of the negative electrode plate, it is possible to use any of known negative electrode materials as listed below under (1) to (3).

(1) Crystalline carbon, such as graphitized carbon obtained by heat-treating natural graphite, coal, petroleum pitch, and the like, at a high temperature.
(2) Amorphous carbon obtained by heat-treating coal, petroleum pitch coke, acetylene pitch coke, and the like.
(3) Metal lithium and a lithium alloy, such as AlLi.

As the electrolytic solution impregnated in the battery element, there is listed, for example, a product obtained in such a way that a salt which is made of cation of an alkali metal, such as Li, K and Na, and which is made of anion of a compound containing halogen such as $ClO_4^-$, $BF_4^-$, $PF_6^-$, $CF_3SO_3^-$, $(CF_3SO_2)_2N^-$, $(C_2F_5SO_2)_2N^-$, $(CF_3SO_2)_3C^-$, and $(C_2F_5SO_2)_3C^-$ is made to dissolve in a highly polar basic solvent which can be used as an electrolytic solution of a secondary battery, such as ethylene carbonate, propylene carbonate, dimethyl carbonate, diethyl carbonate, methylethyl carbonate, γ-butyrolactone, N,N'-dimethylformamide, dimethyl sulfoxide, N-methylpyrrolidone, and m-cresol. Further, it is also possible to independently use a solvent and an electrolyte salt which are made of these basic solvents, or to together use the plurality of the solvents and the electrolyte salts. Further, it is also possible to use a gel electrolyte (polymer gel containing an electrolytic solution). Further, it is also possible to add a small amount of sulfolane, dioxane, dioxolane, 1,3-propanesultones, tetrahydrofurans, vinylene carbonate, and the like.

The above described materials are examples in the case where the electric device element is a lithium ion secondary battery. The electrical device element configuring the film-packaged electric device according to the present invention also includes a lead battery, a nickel-cadmium battery, and a nickel hydride battery. Further, the electrical device element also includes capacitor elements, such as an electric double layer capacitor and an electrolytic capacitor.

The invention claimed is:

1. A film-packaged electric device comprising:
an electric device element that has a positive lead, positive electrode plates, positive electrode extending portions that lead out from each of said positive electrode plates, a negative lead, negative electrode plates, negative electrode extending portions that lead out from each of said negative electrode plates, and separators, wherein said positive and negative electrode plates are alternately laminated via the separator, said positive electrode extending portions are collectively joined to said positive lead, and said negative electrode extending portions are collectively joined to said negative lead; and
a package film that has a metal layer and a heat fusion layer that is formed on one side of the metal layer, which is configured to surround the electric device element with the heat fusion layer facing inward, and configured such that the heat fusion layers that face each other in a periphery of the package film are heat-fused to each other; and
a protection member, arranged between a first joining portion that is a portion of the positive electrode extending portion joined to the positive electrode lead and a portion of the heat fusion layer which covers an area of at least the first joining portion, and/or arranged between a second joining portion that is a portion of the negative electrode extending portion joined to the negative electrode lead and a portion of the heat fusion layer which covers an area of at least the second joining portion,
wherein the protection member comes in close contact with at least one corner selected from among a corner of the first joining portion of the positive electrode extending portion, a corner of an end of the positive electrode lead jointed to the positive electrode extending portion, a corner of the second joining portion of the negative electrode extending portion, and a corner of an end of the negative electrode lead jointed to the negative electrode extending portion.

2. The film-packaged electric device according to claim 1, wherein the protection member is formed into a frame shape which can be made to cover the peripheral end of the electric device element,
the protection member further comprises:
a protective portion for the positive electrode, in which an opening portion that the positive electrode lead penetrated if formed, and which covers both a corner of the first joining portion of the positive electrode extending portion and a corner of an end of the positive electrode lead jointed to the positive electrode extending portion, and
a protective portion for the negative electrode, in which an opening portion that the negative electrode lead penetrated is formed, and which covers both a corner of the second joining portion of the negative electrode extending portion and a corner of an end of the negative electrode lead joined to the negative electrode extending portion.

3. A film-packaged electric device according to claim 1, wherein thickness of the protection member is 100 μm and the protection member is formed of polyethylene.

4. The film-packaged electric device according to claim 1 or claim 3, wherein the protection member has elasticity.

5. The film-packaged electric device according to claim 1, wherein the protection member is formed of a sheet material or film material which is folded into two portions,
the protection member comprises a first protective portion corresponding one of the two portions, a second protective portion corresponding the other of the two portions, and a connective portion that connects the first protective portion with the second protective portion, and in which an opening portion that the positive electrode lead of the negative electrode lead penetrates is formed,
wherein the first protective portion is arranged between a corner of the first joining portion of the positive electrode extending portion and a portion of the heat fusion layer which covers at least the corner of the first joining portion of the positive electrode extending portion, and arranged between a corner of the second joining portion of the negative electrode extending portion and a portion of the heat fusion layer which covers at least the corner of the second joining portion of the negative electrode extending portion,
wherein the second protective portion is arranged between a corner of an end of the positive electrode lead jointed to the positive electrode extending portion and a portion of the heat fusion layer which covers at least the corner of the end of the positive electrode lead, and arranged between a corner of an end of the negative electrode lead jointed to the negative electrode extending portion and a portion of the heat fusion layer which covers at least the corner of the end of the negative electrode lead, and
wherein the first protective portion and the second protective portion come closer to each other as approaching the opening portion.

6. The film-packaged electric device according to claim 1, wherein the package film has a portion which comes in close contact with the protection member coating the corner.

* * * * *

UNITED STATES PATENT AND TRADEMARK OFFICE
CERTIFICATE OF CORRECTION

PATENT NO.        : 8,741,468 B2
APPLICATION NO.   : 13/682345
DATED             : June 3, 2014
INVENTOR(S)       : Masatomo Mizuta and Shunji Noda It is certified that error appears in the above-identified patent and that said Letters Patent is hereby corrected as shown below:

In the specification

Column 12, Line 39: Delete "AlLi." and insert -- AlLi. --

In the claims

Column 13, Line 46: In Claim 2, delete "if" and insert -- is --

Column 14, Line 6: In Claim 2, delete "joined" and insert -- jointed --

Column 14, Line 22: In Claim 5, delete "of" and insert -- or --

Signed and Sealed this
Eleventh Day of November, 2014

Michelle K. Lee
*Deputy Director of the United States Patent and Trademark Office*